Aug. 24, 1965     D. CAMERON     3,202,010
SPEEDOMETER-ODOMETER DRIVE ADAPTER
Filed Feb. 26, 1964
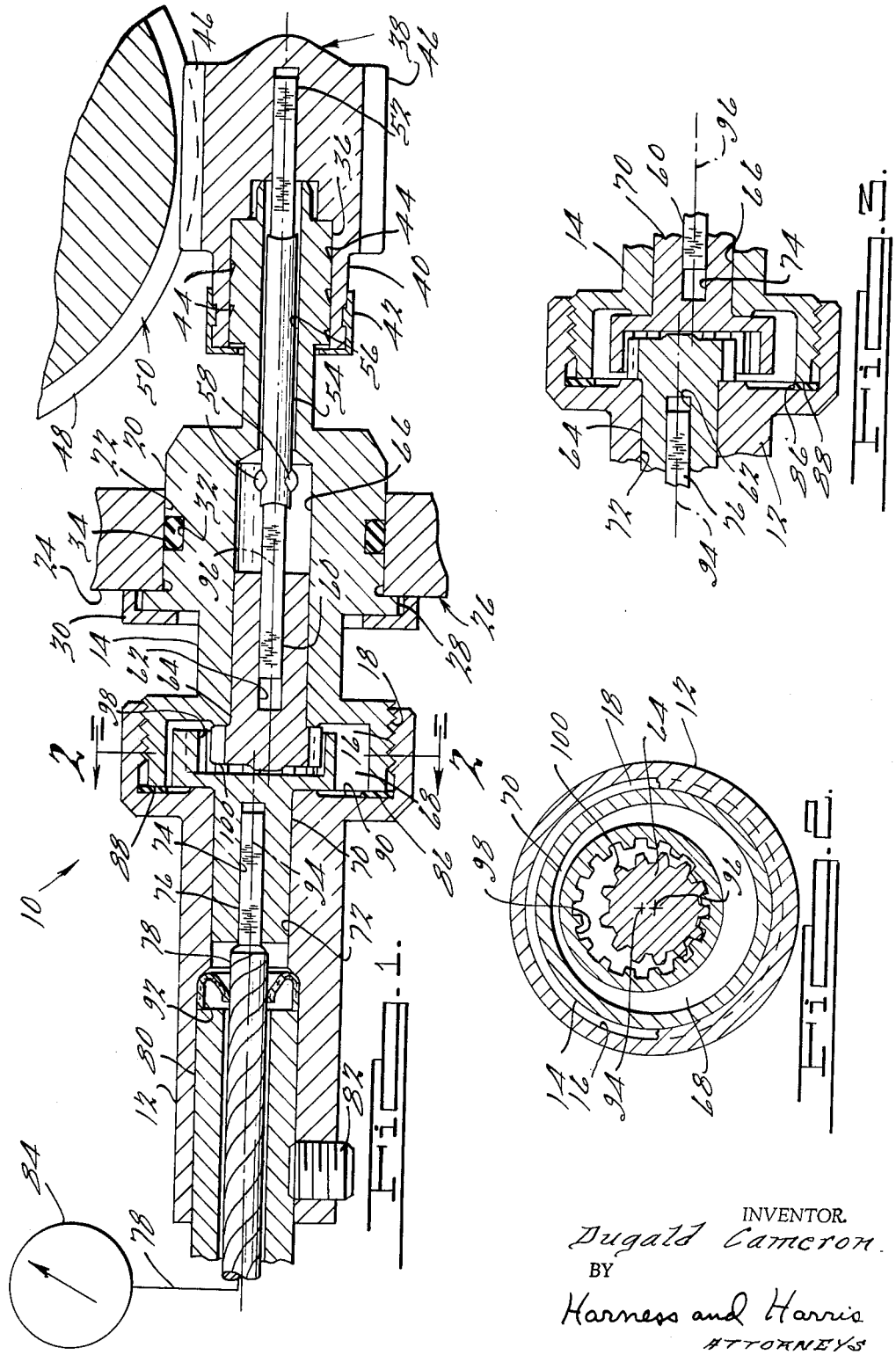
INVENTOR.
*Dugald Cameron.*
BY
*Harness and Harris*
ATTORNEYS

United States Patent Office 3,202,010
Patented Aug. 24, 1965

3,202,010
SPEEDOMETER-ODOMETER DRIVE ADAPTER
Dugald Cameron, Taylor, Mich., assignor to Chrysler Corporation, Highland Park, Mich., a corporation of Delaware
Filed Feb. 26, 1964, Ser. No. 347,562
3 Claims. (Cl. 74—438)

This invention relates generally to a vehicle speedometer or odometer and more particularly to the arrangement for driving such meters in accordance with vehicle operation.

Presently, the accepted mechanical way of driving a speedometer, for example, is to have the vehicle transmission output shaft rotate a gear which is in turn operatively connected to one end of a flexible speedometer drive cable. This is usually achieved by having a worm thread, formed on the output shaft, engage a pinion gear connected to the speedometer cable.

Such an arrangement as briefly described above presents some inherent limitations. That is, within a defined range, any two vehicles may well differ in axle ratio, wheel diameter and/or tire size. Since the worm thread on the transmission output shaft can not as a practical matter be changed from one vehicle to another, the rotation of the pinion gear will not always be a correct indication, at the speedometer, of vehicle operatin.

Accordingly, a variety of drive pinions are usually produced and selectively employed so as to achieve, at the driven meter, a more nearly accurate indication of vehicle operation. For example, for a particular vehicle, pinion gears may be produced in a range of fifteen, seventeen, nineteen and twenty-one teeth. However, the same vehicle may, for example, have four optional axle ratios and four tire sizes. It, therefore, becomes apparent that from just the axle ratios and tire sizes, sixteen possible combinations exist while only four pinion gears are available. Consequently, it should be apparent ttat it is a practical impossibility to select pinion gears in such a manner as to always drive the speedometer accurately relative to vehicle operation.

Accordingly, it is a general object of this invention to provide means interposed between a speedometer drive pinion gear and the speedometer in order to correct variations which may exist as between the rate of rotation of the drive pinion and the correct rate of rotation for that particular vehicle speed.

Another object of this invention is to provide an adapter which will either increase or decrease by a predetermined ratio the rate of rotation of the pinion gear depending on the application of said adapter to the pinion gear.

Other objects and advantages of this invention will become apparent when reference is made to the following description and accompanying drawings wherein:

FIGURE 1 is a longitudinal cross-sectional view of an adapter constructed in accordance with the teachings of this invention and shown operatively connected with a vehicle speedometer and/or odometer and a transmission output shaft;

FIGURE 2 is a cross-sectional view taken substantially on the plane of line 2—2 of FIGURE 1 and looking in the direction of the arrows; and FIGURE 3 is a fragmentary cross-sectional view of FIGURE 1 illustrating an application of said adapter different from that shown in FIGURE 1.

Referring now in greater detail to the drawings, FIGURE 1 illustrates an adapter 10 as being comprised of housings 12 and 14 secured to each other as by threaded portions 16 and 18.

Housing 14 has a body portion 20 closely received within an aperture 22 formed in the casing wall 24 of a transmission assembly 26. A flange 28 provides an abutment for the inward travel of housing 14 while a suitable clamping bracket 30 prevents the unauthorized withdrawal of body portion 20 out of aperture 22. Preferably, an annular groove 32 is formed in the periphery of body 20 so as to contain a sealing member 34 therein and thereby effectively seal the body 20 within aperture 22.

One end of housing 14 is provided with a generally cylindrical portion 36 of reduced diameter which serves as a bearing surface for a pinion gear 38 having a collar-like extension 40. Preferably, a spring clips 42 is provided about collar 40 to prevent accidental removal of gear 38 from bearing 36. A spiral groove 44 formed in the cylindrical surface of bearing 36 provides a main path for lubricant.

Teeth 46 of gear 38 are maintained in engagement with the worm thread 48 of transmission output shaft 50. As output shaft 50 rotates, pinion gear 38 rotates about bearing 36 thereby rotating end 52 (preferably of square cross-section) of rod 54. A clearance passageway 56 permits a rather loose reception of rod 54 therethrough. However, peened portions 58 prevent the withdrawal of rod 54 from passageway 56 except in one direction. The other end 60 (also preferably of square cross section) of rod 54 is received within a generally mating recess 62 formed in a gear 64 which is journalled within an appropriate bearing bore 66.

The threaded end of housing 14 is of enlarged diameter and of generally cup-shaped configuration providing a space or chamber 68, in conjunction with housing 12, for the reception therein of the toothed portions of gears 64 and 70.

Gear 70, journalled within a bearing bore 72 of housing 12, receives within a mating recess 74, the driven end 76 of a flexible speedometer drive cable core 78. The speedometer cable sheathing 80 may be secured to housing 12 as by a suitable screw 82. The other end of cable 78 may be suitable connected to a speedometer and/or odometer as indicated at 84.

An annular seal 86 is provided between the open end surface 88 of housing 14 and the inner surface 90 of the internally threaded cup-like end portion of housing 12. Additionally, an annular seal 92 is provided within housing 12 about cable core 78 in order to prevent undesirable passage of lubricant therethrough.

As seen in both FIGURES 1 and 2, the centerlines 94 and 96 of bores 72 and 66 are eccentrically disposed with respect to each other thereby enabling the spur gear 64 of a lesser number of teeth to engage generally at one side the greater number of teeth of the internal gear 70. For purposes of illustration internal gear 70 is shown to be comprised of sixteen teeth 98 while the spur gear 64 is illustrated as being comprised of thirteen teeth 100. The resulting gear ratio of spur gear 64 to internal gear 70 is then 13:16; in other words, if pinion gear 38 were connected directly to cable core 78, each revolution of pinion gear 38 would result in one revolution of cable core 78. However, with adapter 10 interposed between pinion gear 38 and cable core 78, one revolution of pinion gear 38 will result in only 13/16 of a revolution of cable core 78. Accordingly, the adapter as illustrated in FIGURES 1 and 2 provides a compact and dependable means for reducing the output of the pinion gear 38 in such situations where the output of the pinion gear 38, because of the variations which may develop as a result of vehicular axle ratio and wheel or tire sizes, indicates a vehicle speed greater than the actual vehicle speed.

FIGURE 3 illustrates another important feature of this invention. That is, bores 66 and 72, although eccentric to each other, are formed to be of substantially the same diameter. Consequently, spur gear 64 and internal gear 70 can be reversed from their respective positions illustrated in FIGURE 1 to the positions shown in FIGURE 3. As a result of such reversal, the gear ratio of the adapter is changed. That is, with the invention as in FIGURE 3, one revolution of pinion gear 38 will result in 16/13 revolutions of cable core 78. Therefore, as illustrated by both arrangements, it is possible to use the same adapter to achieve correction of the pinion gear output by either proportionately increasing the speed of the speedometer drive cable or proportionately decreasing the speed of the speedometer drive cable in order to obtain a more accurate indication of vehicle operation.

Although only one embodiment of the invention has been disclosed and described it is apparent that other embodiments and modifications of the invention are possible within the scope of the appended claims.

I claim:

1. A speedometer drive adapter comprising first and second housing sections, a pilot diameter formed on said first housing for reception in a mounting aperture of a cooperating vehicle transmission casing, a bearing surface formed on and near one end of said first housing for journalling a pinion gear adapted to engage an output shaft of said vehicle transmission, a first connecting portion formed at the other end of said first housing, a second connecting portion formed at one end of said second housing, said first and second connecting portions when engaged with each other forming a chamber for the containment therein of an internal gear and a spur gear, a first cylindrical body portion projecting axially from said spur gear, a first cylindrical bearing recess formed in said first housing section for the rotatable reception of said first cylindrical body portion therein, a drive shaft extending through said one end of said first housing section and engaging said spur gear and adapted to engage said pinion gear in order to rotate said spur gear in accordance with the rotation of said pinion gear, a second cylindrical body portion projecting axially from said internal gear, a second cylindrical bearing recess formed in said second housing section for the rotatable reception of said second cylindrical body portion therein, a drive portion formed in said second cylindrical body portion adapted to engage cooperating motion transmitting means for driving an associated speedometer, said first cylindrical bearing recess being parallel with but eccentrically disposed to said second cylindrical bearing recess so as to enable said spur gear to be disposed generally within said internal gear and operatively engage said internal gear generally at one side thereof.

2. A speedometer drive adapter comprising first and second housing sections, a pilot diameter formed on said first housing for reception in a mounting aperture of a cooperating vehicle transmission casing, an external bearing surface formed near one end of said first housing for journalling a pinion gear adapted to engage an output shaft of said vehicle transmission, a first enlarged connecting portion formed at the other end of said first housing having a cup-like opening and an externally formed threaded portion on the cylindrical wall of the cup-like opening, a second enlarged connecting portion formed at one end of said second housing forming a second cup-like opening and an internally formed threaded portion in the cylindrical wall of the second cup-like opening, said internally formed threaded portion and said externally formed threaded portion being effective to connect said connecting portions to each other thereby forming an enlarged chamber for the containment therein of an internal gear and a spur gear, a first cylindrical body portion formed on said spur gear, a first cylindrical bearing recess formed in said first housing section for the rotatable reception of said first cylindrical body portion therein, a drive shaft extending through said one end of said first housing section and engaging said spur gear and adapted to engage said pinion gear in order to rotate said spur gear in accordance with the rotation of said pinion gear, a second cylindrical body portion formed on said internal gear, a second cylindrical bearing recess formed in said second housing section for the rotatable reception of said second cylindrical body portion therein, a drive portion formed in said second cylindrical body portion adapted to engage cooperating motion transmitting means for driving an associated speedometer, said first cylindrical bearing recess being parallel with but eccentrically disposed to said second cylindrical bearing recess so as to enable said spur gear to be disposed generally within said internal gear and in operative engagement therewith and said internally formed threaded portion also being disposed eccentrically to said second bearing recess.

3. A speedometer drive adapter comprising first and second housing sections, a pilot diameter formed on said first housing for reception in a mounting aperture for a cooperating vehicle transmission casing, an annular groove formed in the periphery of said pilot diameter for the reception therein of an annular sealing member, a bearing surface formed near one end of said first housing for journalling a pinion gear adapted to engage an output shaft of said vehicle transmission, a first enlarged connecting portion formed at the other end of said first housing having a first cup-like opening and an externally formed threaded portion on the cylindrical wall of the cup-like opening, a second enlarged connecting portion formed at one end of said second housing forming a second cup-like opening and an internally formed threaded portion in the cylindrical wall of the second cup-like opening, said internally formed threaded portion and said externally formed threaded portion being effective to connect said connecting portions to each other thereby forming an enlarged chamber for the containment therein of an internal gear and a spur gear, a substantially flat annular seal interposed between the cylindrical wall of the first cup-like opening at the open end thereof and the inner end surface of said second cup-like opening, a first cylindrical body portion formed on said spur gear, a first cylindrical bearing recess formed in said first housing section for the rotatable reception of said first cylindrical body portion therein, a drive shaft extending through said one end of said first housing section and engaging said spur gear and adapted to engage said pinion gear in order to rotate said spur gear in accordance with the rotation of said pinion gear, a second cylindrical body portion formed on said internal gear, a second cylindrical bearing recess formed in said second housing section for the rotatable reception of said second cylindrical body portion therein, a drive portion formed in said second cylindrical body portion adapted to engage cooperating motion transmitting means for driving an associated speedometer, said first cylindrical bearing recess being parallel with but eccentrically disposed to said second cylindrical bearing recess so as to enable said spur gear to be disposed generally within said internal gear and operatively engage said internal gear generally at one side thereof.

References Cited by the Examiner

UNITED STATES PATENTS

| 1,225,102 | 5/17 | Banks | 74—325 |
| 1,712,956 | 5/29 | Gustafson | 74—325 X |
| 1,713,272 | 5/29 | Eason | 74—325 X |

DON A. WAITE, *Primary Examiner.*